United States Patent [19]

Tsuzuki et al.

[11] 4,348,653
[45] Sep. 7, 1982

[54] METHOD AND SYSTEM FOR INDICATING AUTOMOBILE ABNORMAL CONDITIONS

[75] Inventors: Yoshihiko Tsuzuki, Anjo; Hiroshi Okazaki, Okazaki; Shinji Shirasaki, Kariya; Masahiro Matsuyama, Kariya; Masanobu Kobayashi, Kariya; Yoji Ito, Kariya, all of Japan

[73] Assignee: Nippondenso Co., Ltd., Kariya, Japan

[21] Appl. No.: 244,776

[22] Filed: Mar. 17, 1981

[30] Foreign Application Priority Data

Mar. 21, 1980 [JP] Japan .................................. 55-36613

[51] Int. Cl.³ .............................................. B60Q 5/00
[52] U.S. Cl. .................................. 340/52 F; 340/57; 340/58; 179/1 SM
[58] Field of Search ................. 340/52 R, 52 B, 52 F, 340/53, 27 R, 62, 670, 57, 58; 179/1 SM

[56] References Cited

U.S. PATENT DOCUMENTS 3,546,668 12/1970 Legler et al. ........................ 340/62
3,823,383 7/1974 Mallinger ............................ 340/670

Primary Examiner—Alvin H. Waring
Attorney, Agent, or Firm—Cushman, Darby & Cushman

[57] ABSTRACT

A system for indicating an abnormal condition of an automobile in which the condition of inspection items relating to the driving of the automobile is detected, and running speed of the automobile is detected. The system decides that the condition of an inspection item has reached a first abnormal level, and upon detection of the stoppage of the automobile after the time point of the decision, a voice cautioning the driver of the abnormal condition of the inspection item is automatically generated. Upon detection of the fact that a second abnormal level higher than the first abnormal level has been reached, a voice warning the driver of the abnormal condition of the inspection item is generated regardless of the driving condition of the automobile.

16 Claims, 7 Drawing Figures

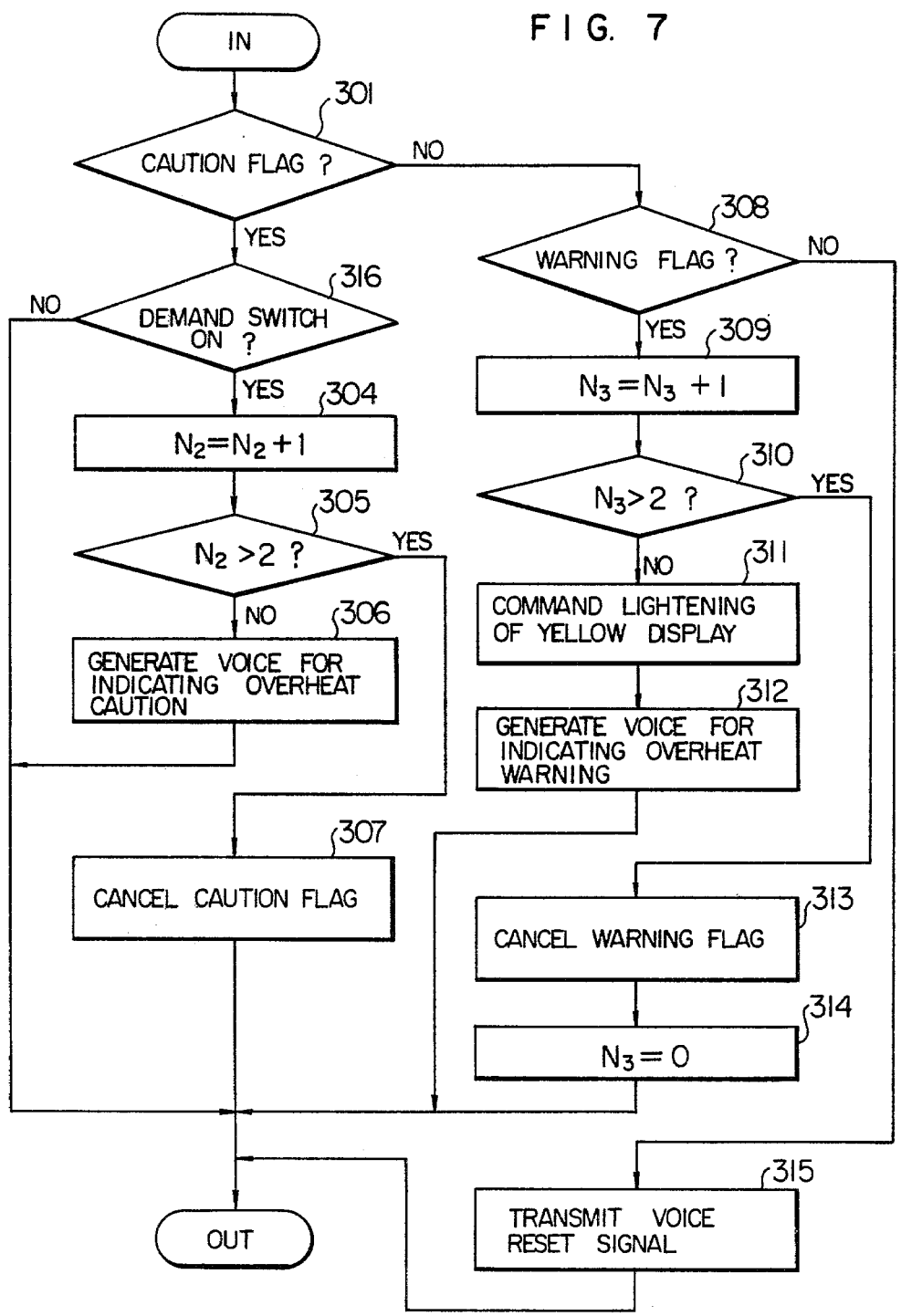

METHOD AND SYSTEM FOR INDICATING AUTOMOBILE ABNORMAL CONDITIONS

The present invention relates to a method and a system for orally indicating an abnormal condition included in predetermined inspection items for driving an automobile.

In the prior art, an automobile has an OK monitor which lights a lamp indicating a point of trouble at the time of occurrence thereof, which OK monitor watches the conditions of the head lamps, the brake lamps, the tail lamps, the washer liquid, the battery liquid, the radiator liquid and the like.

This OK monitor informs the driver of a point of trouble by the lighting of a lamp, and therefore it may be possible that the driver overlooks the warning of the particular trouble while driving the automobile. In recent years, means for warning the driver of a trouble using a voice such as a voice synthesizer have come to find practical applications. If such means issues a warning frequently, the driving skill may be adversely affected. Especially if a warning of a small trouble is issued while the automobile is being driven, the driver may psychologically, be undesirably upset.

The present invention has been developed in view of this problem, and an object of this invention is to provide a method including the following steps and an apparatus for performing the method. The method according to this invention, comprises steps of monitoring the conditions of items to be inspected in driving the automobile, deciding that the condition of an inspection item has reached a first abnormal level, detecting that the driving of the automobile has been stopped upon or after the time of the decision, automatically issuing a voice warning of the abnormal condition of the particular inspection item upon the detection of automobile stoppage, deciding that the condition of the particular inspection item has reached a second abnormal level higher in abnormality than the first abnormal level, and automatically issuing a voice warning the driver of the abnormal condition of the inspection item regardless of the running condition of the automobile at the time of the second decision, to make it possible to inform the driver orally of the abnormal condition of the inspection item without causing any unnecessary strain of the driver while at the same time enabling him to carry out the instructions specified to rectify the abnormal condition.

According to the present invention, the degree of abnormality of the inspection items is divided into two levels for decision, so that in the case of an abnormal condition low in abnormality level, the driver is informed of the abnormal condition by voice only after the automobile has stopped, thus the driver is prevented from being exposed to unnecessary strain.

According to another aspect of the present invention, it is possible to indicate an abnormal condition of the automobile pertinently by using a speed sensor for detecting the running condition of the automobile correctly.

These and other objects and advantages of the present invention will become apparent by references to the following description and accompanying drawings wherein:

FIG. 7 is an operational flowchart showing the processes of an operational routine of notice and warning of an overheat for the device of FIG. 6.

Figure 1:
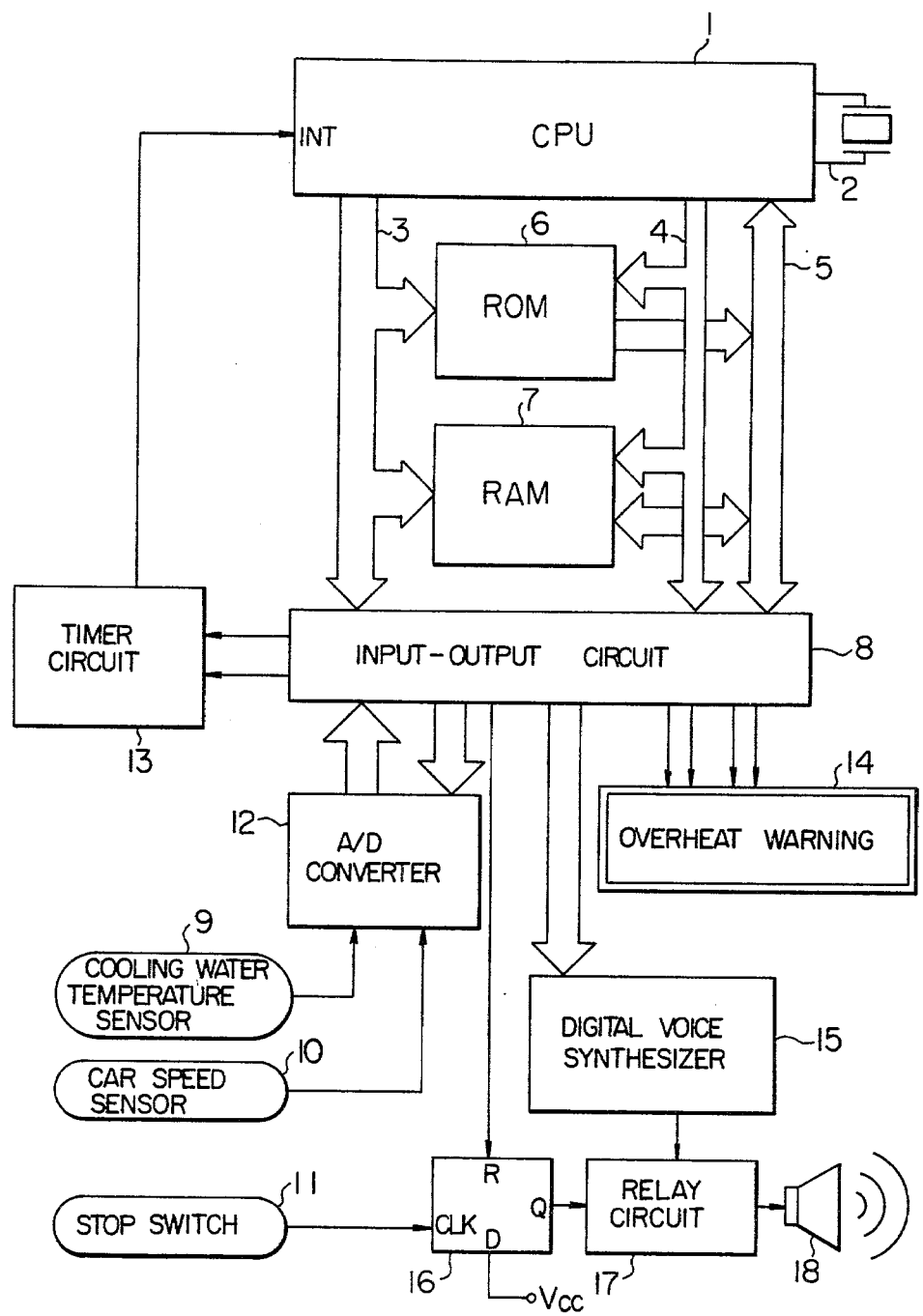
FIG. 1 is a diagram showing a general configuration of an embodiment of an automobile abnormal condition indicator system according to the present invention.

The present invention will be described below with reference to the embodiments shown in the accompanying drawings. FIG. 1 shows a general construction of an embodiment, which uses a car-mounted microcomputer for executing a software digital operation in accordance with a predetermined program of abnormal condition indication.

In FIG. 1, reference numeral 1 designates a central processing unit of the car-mounted microcomputer. This central processing unit 1 has a crystal oscillator 2 to produce a reference clock of several MHz, in synchronism with which a software digital operation is executed. The central processing unit 1 is also connected with operational means comprising a read only memory (ROM) 6, a random access memory (RAM) 7 and an input-output circuit 8 for transmitting and receiving various information through an address bus 3, a control bus 4 and a data bus 5. These component elements are all made of semiconductor integrated circuits. The read only memory 6 contains an abnormal condition indication program in which the operational sequence for detecting an abnormal condition and oral indication thereof is recorded by step, and voice data for generating a predetermined voice for making such a voice indication. This operational process is executed by the central processing unit 1 sequentially reading out the operational steps. The various data in the course of operation are temporarily stored in the random access memory 7 on the one hand and read out as required on the other hand.

Further, the input-output of various signals between the central processing unit 1 and the car-mounted microcomputer and external devices is regulated by the input-output circuit 8.

Numeral 9 designates a cooling water temperature sensor, including a thermistor or the like, namely, means for detecting the temperature of the cooling water of the engine. Numeral 10 designates a car speed sensor arranged in the vicinity of a rotary magnet within a speed meter, which speed sensor 10 comprises an electromagnetic pick-up for generating an on-off signal proportional to the car speed and an F/V converter for converting the signal produced by the electromagnetic pick-up into an analog car speed voltage. Numeral 11 designates a stop switch adapted to be turned on when it is desired to stop the voice generation. This switch 11 is mounted on an instrument panel or handle for easy operation by the driver. Numeral 12 designate an A/D converter for converting an analog signal into a digital signal, which converts the water temperature signal produced by the cooling water temperature sensor 9 and the car speed signal produced by the car speed sensor 10 into digital signals sequentially.

Numeral 13 designates a timer circuit comprising a flip-flop supplied with a set-reset signal from the output of the input-output circuit 8, an oscillator circuit which starts oscillation in response to the activation or set of the flip-flop, and a counter for counting the oscillation pulses from the oscillator circuit and producing a 1-minute pulse to resume the counting operation from the initial state when the count reaches a time length corresponding to one minute. When this counter is set, it produces a 1-minute pulse for every minute. Numeral 14 designates an indicator including first and second flip-flop supplied with set and reset signals from the input-output circuit 8, and yellow and red lamps adapted to be lit in response to the output of the first and second flip-flops. By lighting one of the yellow and red lamps, the letters warning the driver of the overheat preprinted on the indication screen are displayed. Numeral 15 designates a digital voice synthesizer, which together with the speaker 18, makes up voice generator means. The digital voice synthesizer 15 synthesizes and produces speech in response to the voice data sequentially delivered from the input-output circuit 8, and uses, for instance, a digital voice synthesizer of PARCOR type described in The Electronics Technology (Denshi Gijutsu), Vol. 21, No. 12. Numeral 16 designates a D flip-flop which is supplied with the signal from the stop switch 11 at the clock terminal CLK and the reset signal from the input-output circuit 8 at the reset terminal R. Numeral 17 designates a relay circuit including a normally-closed relay by which the signal transmission between the speaker 18 and the amplifier in the last stage of the digital voice synthesizer 15 is subjected to on-off control in response to the output signal from the D flip-flop 16. Specifically, when the output signal from the D flip-flop 16 is at low level, the signal transmission is turned on, while when the output signal is at high level, the signal transmission is turned off. The component elements 1 to 18 included in this general configuration diagram are adapted to be actuated in response to the stabilizing voltage Vcc produced from a stabilized power circuit (not shown) operated by the power supplied from the car-mounted battery when the key switch (not shown) is turned on.

Now, the operation of the circuits of the above-mentioned general construction described above will be described with reference to the operational flowchart shown in FIGS. 2 to 5.

Figure 2:
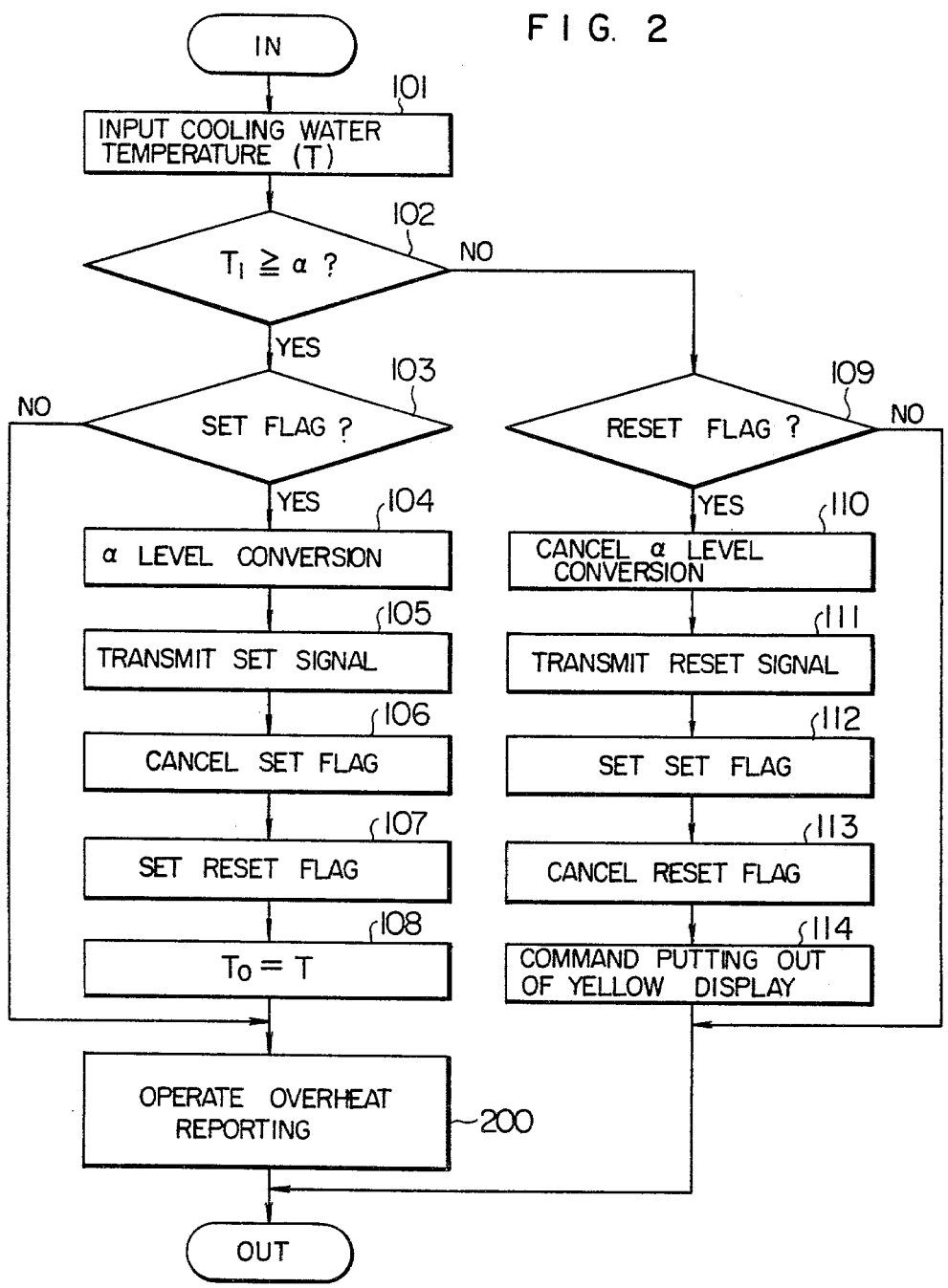
FIG. 2 is an operational flowchart showing the processes of the operational routine for overheat indication.
Figure 3:
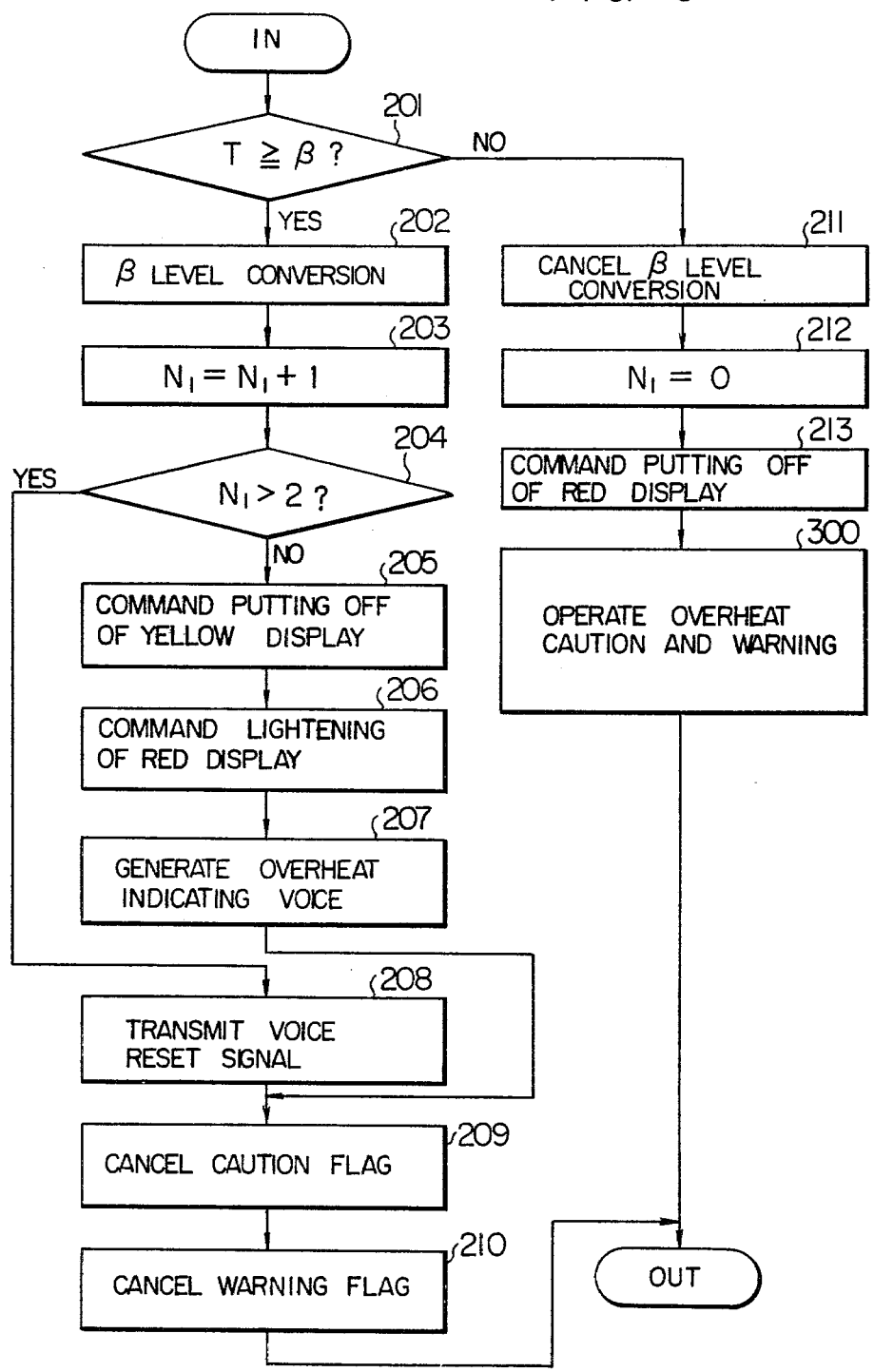
FIG. 3 is an operational flowchart showing the processes of an operational routine for reporting an overheat relating to FIG. 2.
Figure 4:
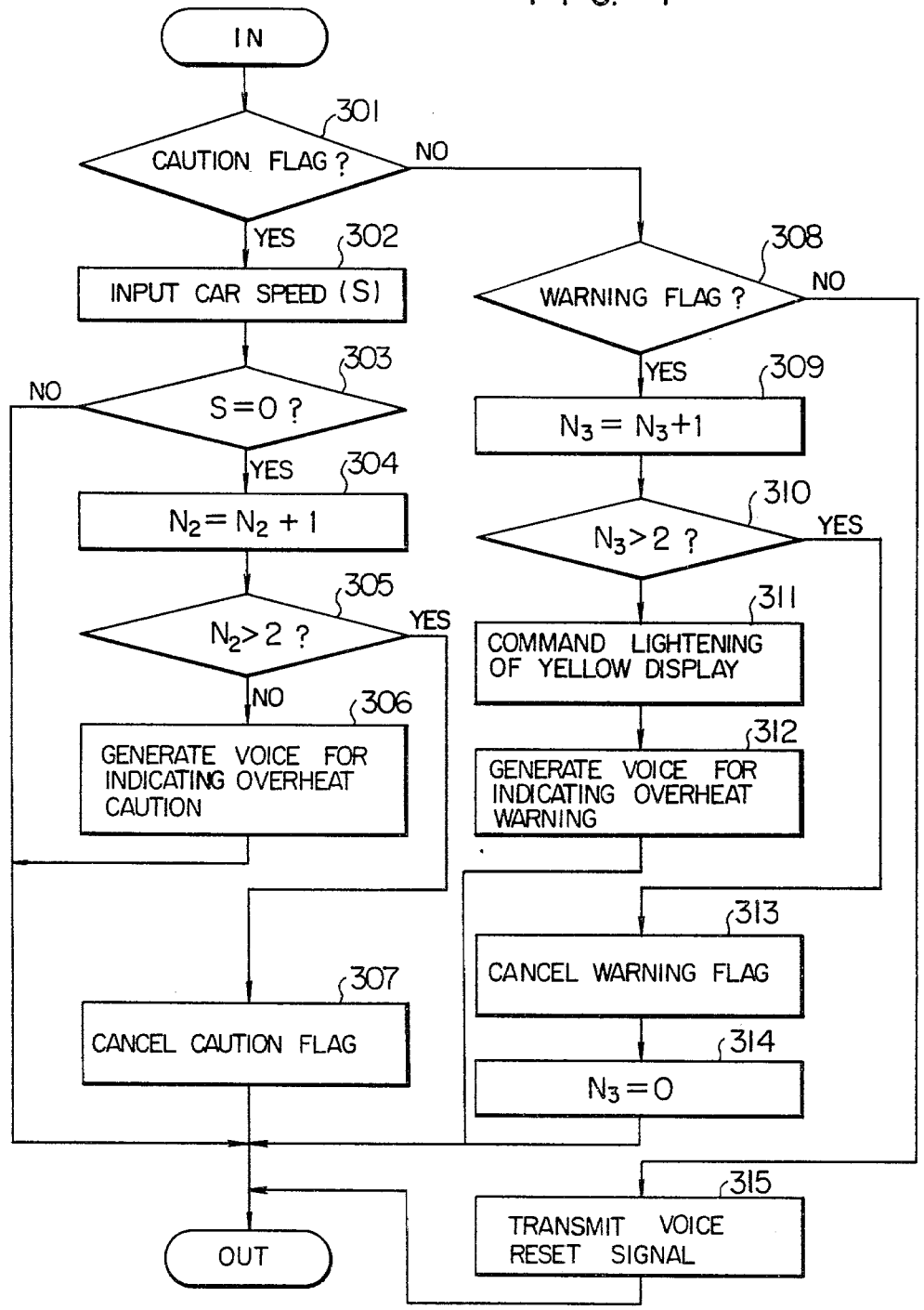
FIG. 4 is an operational flowchart showing the processes of an operational routine for notice and warning of an overheat relating to FIG. 2.
Figure 5:
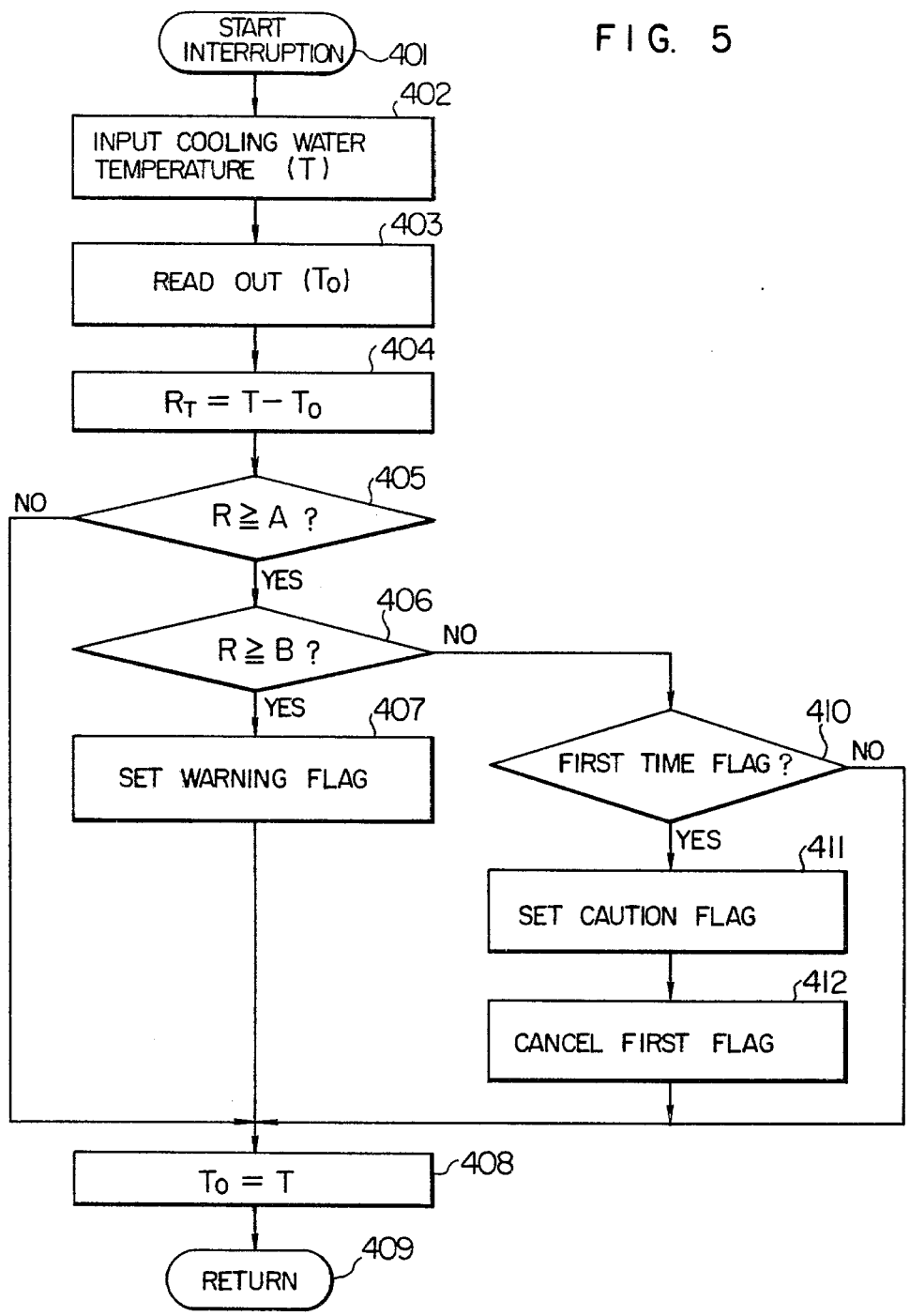
FIG. 5 is an operational flowchart showing the processes of a routine of interruption operations based on a 1-minute pulse issued from a timer circuit.

As already explained, FIG. 2 is an operational flowchart showing the processes of the operating routine of overheat indication among the operations of the microcomputer according to an abnormal condition indication program, FIG. 3 is an operational flowchart showing the processes of an operating routine of overheat announcement in FIG. 2, FIG. 4 is an operational flowchart showing the processes of the routine of caution, warning and processing of overheat in FIG. 3, and FIG. 5 is an operational flowchart showing the processes of an interrupting operation routine based on the 1-minute pulse from the timer circuit.

In an automobile having these devices, when the key switch thereof is turned on for starting the driving thereof, stabilized power supply circuit not shown supplies a stabilized voltage to the component elements 1 to 18 to actuate them. By the start of operation, the register, the counter, the latch and the like in the microcomputer are set in an initial condition required to start the operational processes. This initial setting process includes the setting of a set flag and a first flag, cancellation of a reset flag, a caution flag and a warning flag, resetting of the condition of the data of number of times $N_1$, $N_2$ and $N_3$ to make $N_1=N_2=N_3=0$, and delivery of a reset signal to the flip-flop of the timer circuit 13 and the first and second flip-flops of the indicator 14. After the initial setting, the operational processes of the main routine including the overheat indication routine of FIG. 2 are repeated in predetermined cycles.

In the overheat indication operational routine in the repeated processes of the main routine, the operational process is started from the water temperature input step 101 of FIG. 2, so that the water temperature signal from the cooling water temperature sensor 9 is stored at the step 101 through the A/D converter 12. Under this condition, the water temperature data T applied is comparatively low since it is at the time of the starting of the engine operation. Thus, the result of the process at the next first water temperature decision step 102 for deciding whether the water temperature T is higher than a decision level $\alpha$ such as 90° C. or not becomes "No", and the transfer is made to the reset flag judging step 109 where, since the reset flag is cancelled by the initial setting, the decision becomes "No", thus completing the first indication operation of the overheat indication operational routine. The operational processes of the main routine including the processes of the overheat indication operational routine are repeated in predetermined cycles, and the overheat indication is not effected by the indicator 14 or the speaker 18.

Thereafter, the temperature of the cooling water increases gradually as the automobile continues to be driven. When the temperature of the cooling water reaches 90° C. for some reason or other, the water temperature data T of 90° C. or higher is applied to and stored at the water temperature input step 101 in FIG. 2. Thus, the decision at the next first water temperature decision step 102 becomes "Yes", and the route to the set flag decision step 103 is taken. Since the set flag is already set by initial setting, the decision at the step 103 becomes "Yes", thus advancing to the $\alpha$ level conversion step 104. At the $\alpha$ level conversion step 104, the decision level $\alpha$ is converted to a predetermined value such as a value corresponding to 85° C. for the purpose of providing a hysteresis to the decision of the first water temperature decision step 102, and transfer is made to the set signal supply step 105. At this set signal supply step 105, a set signal is supplied to the flip-flop of the timer circuit 13 for the purpose of starting the operation of the particular timer. Then the route is taken to the set flag caoncel step 106 for cancelling the set flag, followed by transfer to the reset flag set step 107 for setting the reset flag. Then the route to the storage step 108 is taken to store the water temperature data T at the current time at a predetermined address of the random access memory 7 to proving an old water temperature data To, followed by transfer to the overheat announcement operational routine 200. At this overheat announcement operational routine 200, the operational process is started from the second water temperature decision step 201 in FIG. 3 thereby to decide whether the water temperature data T is higher than a value corresponding to the decision level $\beta$ such as 115° C. or not. Since it is immediately after the water temperature data T reached a value corresponding to 90° C., the decision at the step 201 is "No", followed by transfer to the β level conversion cancel step 211. At this β level conversion cancel step 211, a calculation is made to return to the initial level if the decision level β is converted to provide a hysteresis to the decision at the second water temperature decision step 201. In view of the fact that the decision level β is not converted in this case, however, the particular value is kept and transfer is made to the next step 212 for resetting number of times. At the step 212 where the number of times is reset, the first time data $N_1$ is reset to zero, followed by advance to the red indication extinction step 213 for supplying a reset signal to the second flip-flop for lighting the read lamp in the indicator 14. Then transfer is made to the overheat caution and warning operational routine 300. At this overheat caution and warning operational routine 300, the operational processes are started from the caution flag decision step 301 in FIG. 4 thereby to decide whether the caution flag is set or not. In view of the fact that the caution flag is cancelled by an initial setting, the decision becomes "No" and transfer is made to the warning flag decision step 308. At this warning flag decision step 308, it is decided whether the warning flag is set or not. Since the warning flag is cancelled by initial setting, the decision at the step 308 becomes "No", followed by transfer to the voice reset signal supply step 315. At the voice reset signal supply step 315, a reset signal is applied to the D flip-flop 16 in order to reduce the output of the D flip-flop 16 to low level, thus completing one operational process of the overheat caution and warning operational routine, namely, one operational process of the overheat indication operational routine. As a result, the set signal supplied from the set signal supply step 105 in FIG. 2 causes the timer circuit 13 to start the counting operation of the counter. When it proceeds to the set flag decision step 103 of FIG. 2 in the overheat indication operational routine, the decision at the step 103 becomes "No" since the set flag is cancelled at the set flag cancel step 106 in the previous operational cycle, so that a change is immediately made to the operational process for advancing to the overheat announcement operational routine 200.

Subsequently, when the counter of the timer circuit 13 counts the time length of one minute and supplies a 1-minute pulse to the interruption terminal INT of the central processing unit 1, the microcomputer temporarily stops the operational process of the main routine and starts the operational process of the interruption routine shown in FIG. 5 from the interruption start step 401. Transfer is thus made to the water temperature input step 402 to supply the water temperature data T based on the water temperature signal from the cooling water temperature sensor 9, followed by transfer to the read-out step 403 where the old water temperature data To of one minute before is read out from the predetermined address of the random access memory 7. Then transfer is made to the change calculation step 404 for determining the amount of change in water temperature for one minute from the formula $R_T = T - T_o$. In this case, if the amount of change $R_T$ is lower than the predetermined value A, the decision at the next first change decision step 405 becomes "No", followed by transfer to the storage step 408 so that the water temperature T at that time is stored at a predetermined address of the random access memory 7 as an old water temperature data To. Advance is made to the return step 409 for restoring the operational process of the main routine that has temporarily been stopped.

Thereafter, the above-mentioned interruption operational process is executed at intervals of one minute in parallel with the operational process of the main routine. When the increase in the temperature of the cooling water causes the change $R_T$ determined at the change calculation step 404 to reach the predetermined value A, the next change decision step 405 becomes "Yes". Advance is made to the second change decision step 406 to decide whether the amount of change $R_T$ is higher than a predetermined value B (B>A) or not. Since the amount of change $R_T$ is such a value as to reach the predetermined value A, the decision is "No", followed by transfer to the first flag decision step 410, the decision at the step 410 becomes "Yes" since the first flag is set by initial setting. Advance is made to the caution flag set step 41 to set a caution flag, followed by transfer to the first flag cancel step 412 thereby to cancel the first flag. Advance is made through the storage step 408 to the return step 409 thereby to restore the operational process of the main routine thus far provisionally suspended in operation.

As a consequence, at the main routine, when it proceeds to the caution flag decision step 301 of FIG. 4 in the overheat indication operational routine, the decision at the step 301 becomes "Yes", and thus advance is made to the car speed input step 302 for supplying the car speed signal from the car speed sensor 10 through the A/D converter 12. At this time, if the automobile is being driven or running and the car speed data S supplied at the car speed input step 302 is not zero, the decision at the next stop decision step 303 becomes "No", thus completing one operational process of the overheat indication operational routine.

When the running of the automobile is stopped such as by a stop traffic signal at an intersection or the like, while repeating the above-mentioned operational processes, the car speed data S supplied at the car speed input step 302 becomes zero and therefore the decision at the next stop decision step 303 becomes "Yes". Transfer is then made to the addition step 304 where 1 is added to the second number of times data $N_2$, that is to make $N_2 = N_2 + 1$. Since this is the first arrival, the second time data $N_2$ becomes 1. Transfer is made to the next frequency decision step 305 for determining whether the second time data $N_2$ is larger than 2 or not. Since the second time data $N_2$ is 1 at this time, the decision becomes "No", followed by transfer to the caution indication voice generation step 306. At the caution indicating voice generation step 306, the overheat caution in the form of voice data stored in the predetermined region of the read only memory 6 is supplied to the digital voice synthesizer 15 sequentially at repetitive intervals of several milliseconds, thus completing one overheat indication operational routine. In this way, the voice "Take care of overheat" is issued from the speaker 18.

When it proceeds again to the overheat indication operational routine, the second time data $N_2$ to be added to the addition step 304 in FIG. 4 takes the value of 2, and the decision at the frequency decision step 305 becomes "No", thus it proceeds to the caution indicating voice generation step 306. As a result, the voice "Take care of overheat" is again produced from the speaker 18. When it proceeds further again to the overheat indication operational routine, the second time data $N_2$ to be added at the addition step 304 becomes 3, and therefore the decision at the frequency decision step 305 becomes "Yes". Transfer is thus made to the caution flag cancel step 307 to cancel the caution flag, thus completing one operational process of the overheat indication operational routine. From the next cycle, the decision becomes "No" when it proceeds to the caution flag of FIG. 4 in the overheat indication operational routine, and it proceeds to the warning flag decision step 308 where the decision becomes "No" and one operational process of the overheat indication operational routine is completed through the voice reset signal supply step 315.

In the above-mentioned repetition of the operational processes, the interruption operational process of FIG. 5 is executed each time of generation of the 1-minute pulse from the timer circuit 13. That is, when the temperature of the cooling water rises gradually, the operational process is started from the interruption start step 401, and it proceeds to the first time flag decision step 410 through the water temperature input step 402, the read-out step 403, the change calculation step 404, the first change decision step 405 and the second change decision step 406. Since the first time flag is cancelled, the decision at the step 410 becomes "No", followed by the advance to the return step 409 through the storage step 408, thus completing one operational process.

If the temperature of the cooling water increases rapidly in the above-mentioned interruption operational process, and the amount of change $R_T$ determined at the change calculation step 404 exceeds the predetermined value B, the decision of the second change decision step 406 to which it proceeds through the first change decision step 405 becomes "Yes", followed by advance to the warning flag setting step 407 where a warning flag is set, so that the main routine is restored through the storage step 408 and the return step 409.

When it proceeds to the warning flag setting step 308 in FIG. 4 of the overheat indication operational routine in the main routine, the decision at the step 308 becomes "Yes" since the warning flag is set already, followed by transfer to the addition step 309 thereby to add 1 to the third time frequency data $N_3$ ($N_3 = N_3 + 1$). Under this condition, since the third frequency data $N_3$ is set at 0 by initial setting, the third time data $N_3$ which is updated by addition becomes 1. Thus the decision at the next frequency step 310 becomes "No", and advance is made to the yellow indication step 311. At the yellow indication step 311, a set signal is supplied to a related first flip-flop in order to turn on the yellow lamp of the indicator 14, followed by transfer to the warning voice generation step 312. At the warning voice generation step 312, the voice data on the overheat warning indication stored in a predetermined area of the read only memory 6 is supplied sequentially to the digital voice synthesizer 15 in repetitive cycles of several milliseconds. In this way, one operational process of the overheat indication operational routine is completed. As a result, the letters of the warning against overheat in the indicator 14 are lit in yellow, and the speaker 18 produces a voice "Warn against overheat".

When it proceeds again to the overheat indication operational routine, the third time frequency data $N_3$ which is added at the addition step 309 in FIG. 4 becomes 2, and the decision at the frequency decision step 310 becomes "No", therefore, transfer is made to the warning indication voice generation step 312 through the yellow indication step 311. Then, the voice "Warn against overheat" is again generated from the speaker 18. Further, when it proceeds again to the overheat indication operational routine, the third time data $N_3$ which is added at the addition step 309 in FIG. 4 becomes 3, therefore, the decision at the number of time decision step 310 becomes "Yes". The transfer is made to the warning flag cancel step 313 to cancel the warning flag, followed by transfer to the frequency reset step 314 thereby to set the third time data $N_3$ at zero, thus completing one operational process of the overheat indication operational routine. From the next cycle of operation, the decision at the warning flag decision step 308 reached through the caution flag decision step 301 in FIG. 4 becomes "No", and one operational process of the overheat indication operational routine is completed through the voice reset signal supply step 315.

When the temperature of the cooling water further increases up to 115° C., the water temperature data T applied and stored at the water temperature input step 101 of FIG. 2 takes a value higher than 115° C. Thus when it proceeds to the second water temperature decision step 201 of FIG. 3, the decision thereof becomes "Yes" followed by transfer to the β level conversion step 202. At the β level conversion step 202, the decision level β is converted into a predetermined value such as a value corresponding to 110° C. in order to provide a hysteresis to the decision at the second water temperature decision step 201. Advance is made to the addition step 203 where 1 is added to the first frequency data $N_1$ ($N_1 = N_1 + 1$). Since it is the first arrival to the step, the first time data $N_1$ takes the value of 1. Thus the decision at the next number of times decision step 204 becomes "No", followed by transfer to the yellow indication cancel step 205. A reset signal is supplied to the first flip-flop for the yellow lamp of the indicator 14, followed by transfer to the red indication step 206 for supplying a set signal to the second flip-flop for the red lamp in the indicator 14, further followed by transfer to the overheat indication voice generating step 207. At the overheat indication voice generation step 207, the voice data for overheat indication stored in the predetermined area of the read only memory 6 are supplied sequentially to the digital voice synthesizer 15 at intervals of several milliseconds. And transfer is made to the caution flag cancel step 209 thereby to cancel the caution flag, and also the transfer is made to the warning flag cancel step 210 thereby to cancel the warning flag, thus completing one operational process of the overheat indication operational routine. As a result, the letters warning the operator of overheat is lit in red at the indicator 14, and the voice "overheated" is issued from the speaker 18.

Upon rearrival at the overheat indication operat operational routine, the first time data $N_1$ which is added at the addition step in FIG. 3 becomes 2, and the decision of the frequency decision step 204 becomes "No", Therefore, transfer is made to the yellow indication cancel step 205, the red indication step 206, the overheat indication voice generation step 207, the caution flag cancel step 209 and the warning flag cancel step 210. Then the voice "overheated" is generated from the speaker 18 again. When the overheat indication operational routine is reached in the third or subsequent cycle, the first time data $N_1$ which is added at the addition step 203 becomes 3 or more, therefore, the decision at the frequency decision step 204 becomes "Yes", followed by transfer to the voice reset signal supply step 208 whereby a reset signal is supplied to the D flip-flop 16. Thus one operational process of the overheat indication operational routine is completed through the caution flag cancel step 209 and the warning flag cancel step 210.

In the case where the temperature of the cooling water decreases below 110° C. during the idling of the automobile engine or the like in subsequent cycles of operational process, the water temperature data T stored at the water temperature input step 101 in FIG. 2 is reduced to a value lower than 110° C. Consequently, upon arrival at the second water temperature decision step 201 in FIG. 3, the decision thereof becomes "No", followed by transfer to the $\beta$ level conversion cancel step 211 thereby to restore the decision level $\beta$ to a value corresponding to 115° C. Advance is then made to the number of times reset step 212 where the first time data $N_1$ is reset, followed by transfer to the red indication cancel step 213, so that a reset signal is supplied to the second flip-flop for turning on the red lamp of the indicator 14. Thus through the overheat and warning operational routine 300, one operational process is completed. The indicator 14 fails to indicate anything by light and informs the passenger or driver of the fact that the overheated condition has ceased.

When the temperature of the cooling water decreases to become lower than 85° C., the water temperature data T applied and stored at the water temperature input step 101 in FIG. 2 takes a value lower than 85° C. Therefore, the decision at the first water temperature decision step 102 becomes "No", followed by advance to the reset flag decision step 109, so that the decision at the step 109 becomes "Yes" since the reset flag has thus far been set. Advance is made to the $\alpha$ level conversion cancel step 110 thereby to restore the decision level $\alpha$ to a value corresponding to 90° C. Advance is made further to the reset signal supply step 111, thus supplying a reset signal to the flip-flop of the timer circuit 13 in order to stop the counting operation threof, followed by transfer to the set flag setting step 112 thereby to set a set flag. Then advance is made to the reset flag cancel step 113 to cancel the reset flag, followed by transfer to the yellow indication cancel step 114 so that a reset signal is supplied to the first flip-flop of the indicator 14, thus completing one operational process of the overheat indication operational routine. As a result, the counting operation of the timer circuit 13 stops, and the monitoring of the change in the cooling water temperature by the interruption routine of FIG. 5 is suspended. The next and subsequent cycles of overheat indication operational routine are such that transfer is made from the water temperature input step 101 to the first water temperature decision step 102. Since the water temperature is lower than 90° C., the decision at the step 102 becomes "No", followed by transfer to the reset flag decision step 109, where the decision becomes "No" since the reset flag is cancelled, thus completing the particular operational process.

In the generation of the voice indicating the overheated condition as described above from the speaker 18, when the driver recognizes the voice and turns on the stop switch 11 in order to stop the generation of the voice, the signal change from the stop switch 11 causes the output of the D flip-flop 16 to change to "high" level, and the relay contact of the relay circuit 17 is opened to stop the transmission of the voice from the digital voice synthesizer 15 to the speaker 18. Thus, no voice is generated from the speaker 18. After stoppage of the voice generation, a reset signal is supplied to the D flip-flop 16 at the voice reset signal supply step 208 or 315, therefore, the output of the D flip-flop 16 is again reduced to "low" level, thus reclosing the relay contact of the relay circuit 17.

Figure 6:
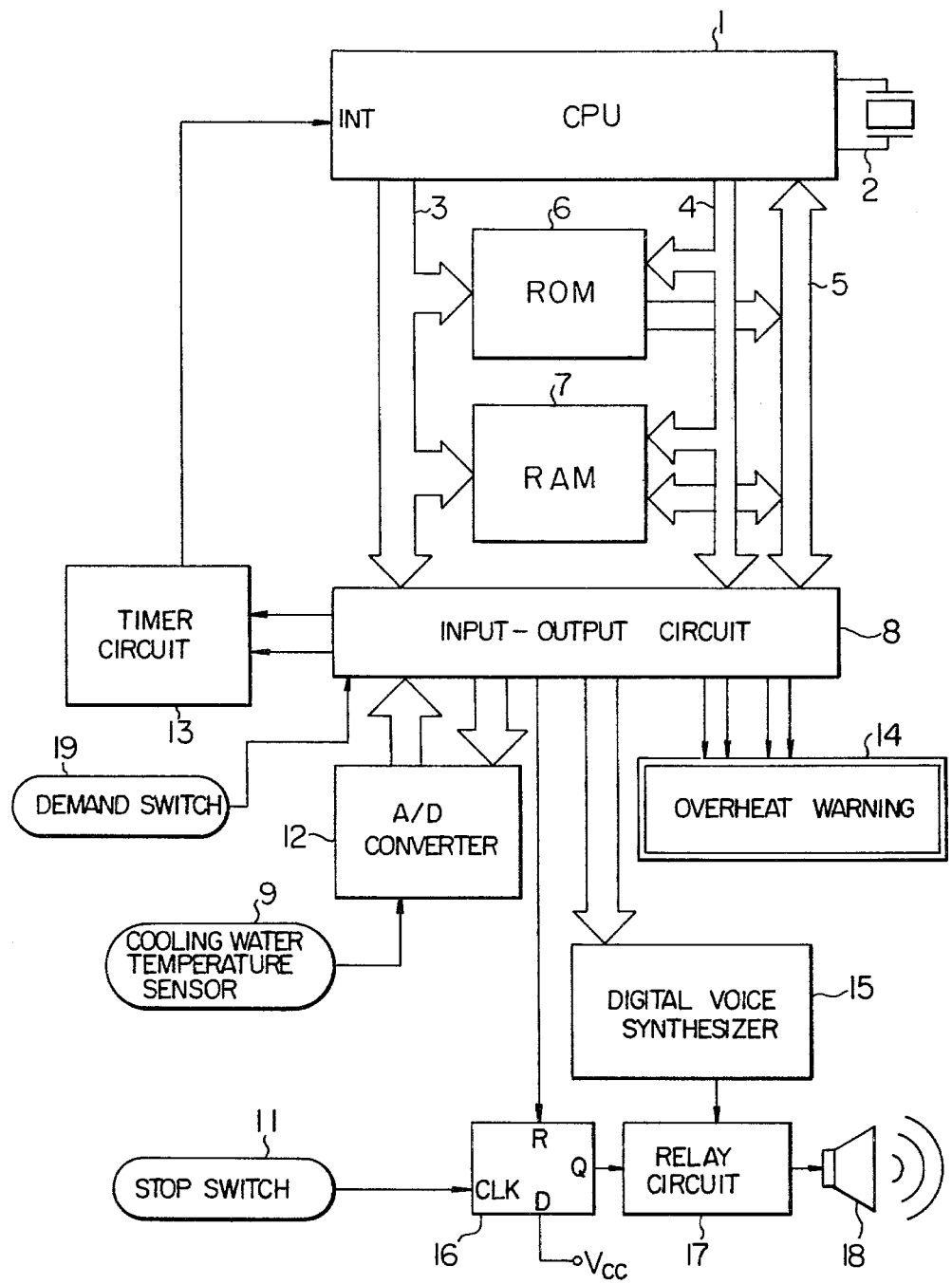
FIG. 6 is a diagram showing a general configuration of a second embodiment of the automobile abnormal condition indicator system according to the present invention.

A general configuration of a second embodiment of the present invention is shown in FIG. 6. In the second embodiment, the car speed sensor 10 provided in the first embodiment of FIG. 1 is lacking and is replaced by a demand switch 19. The output of the demand switch 19 is connected to the input-output circuit 8 so that the on-off signal of the demand switch 19 is applied to the input-output circuit 8. Those component elements in FIG. 6 which are similar to those in the embodiment of FIG. 1 are shown by similar reference numerals.

The second embodiment is different from the first embodiment in that while a caution voice is generated by the car speed sensor 19 upon detection of the fact that the car speed is reduced to zero in the first embodiment, a caution voice signal is generated upon detection of the fact that the demand switch 19 has been turned on in the second embodiment. The operation of the second embodiment is identical to that of the first embodiment except the fact that in the second embodiment, a caution signal is generated not upon detection of the car speed of zero but in response to the turning on of the demand switch 19. An operational flowchart of the overheat caution and warning operational routine for the second embodiment is shown in FIG. 7. In the flowchart of FIG. 7, as compared with that of FIG. 4, the car speed input step 302 is eliminated, and in place of the step 303 for deciding the car speed of zero, the demand switch on decision step 316 is added, the remainder being the same as FIG. 4. At the demand switch on decision step 316, it is decided whether the signal level has risen in response to the turning on of the demand switch 19 or not, and if it has risen, advance is made to the addition step 304.

In the above described embodiments, when the temperature of the cooling water exceeds 90° C., the degree of change of the water temperature is monitored at intervals of one minute on the basis of the water temperature signal from the cooling water temperature sensor 9. When the degree of change reaches a predetermined value A, a caution of overheat is issued by voice when the car has stopped; while when the degree of change of the water temperature reaches a predetermined value B (B>A), an indication warning against the overheated condition is made by voice regardless of the driving condition of the car. As an alternative method, the above-mentioned system of caution and warning may be applied to other abnormal conditions than the overheat. For instance, four air pressure sensors may be provided for proportionately detecting the air pressure of the four tires of a car, whereby it is decided that the air pressure of one of the four tires is reduced below a predetermined level in response to signals from the four air pressure sensors. From the time of this decision, the degree of change of the air pressure of the tires is monitored, and when this degree of change reaches a predetermined value A (within a range not affecting the driving of the car), a caution of the reduced air pressure is indicated by voice upon stoppage of the car. When the degree of air pressure change reaches a predetermined value B (B>A), on the other hand, a warning of the reduced air pressure is issued by voice regardless of the driving conditions of the car. As another alternative, the invention may be used for the purpose of forecasting a battery voltage, the engine oil condition or a lamp disconnection or for monitoring all of these.

In the above-described embodiments, a voice is synthesized by a digital voice synthesizer on the basis of the voice data supplied from the read only memory 6 storing the voice data through the input-output circuit 8 and the voice is issued from the speaker 18. Instead of this system, the digital voice synthesizer 15 may contain a read only memory for storing the voice data, and the first address of the voice generating area of the read only memory is designated by the microcomputer, so that the voice data in the addresses following the first address are read out sequentially to synthesize the voice, thus shortening the time of operation of the microcomputer.

The above-described embodiments comprise the digital voice synthesizer 15 and the speaker 18, but these component elements may be replaced by a magnetic tape for storing voice data on the indication of abnormal conditions, and a circuit for searching a predetermined area of the magnetic tape and reproducing the voice data in that particular area. Also, the microcomputer used as operational processing means may be replaced by a hard logic construction including electronic circuits.

Furthermore, in place of the stop switch 11 for stopping the voice generation temporarily, means may be used for recognizing the voicing of the word "stop" by the driver or a passenger for provisional stoppage of voice generation.

In the first embodiment mentioned above, a voice of caution is generated when the car speed signal from the car speed sensor 10 reaches zero indicating the car stoppage. The car speed signal may not necessarily be zero but a low value approximate to zero.

Further, the decision on the stoppage of the car may be made on the basis of the fact that the brake is kept applied for longer than a predetermined length of time.

What is claimed is:

1. A method of indicating an abnormal condition of an automobile, comprising the steps of:
monitoring inspection items relating to the driving of the automobile;
deciding that the condition of an inspection item has reached a first abnormal condition;
automatically generating a voice cautioning the driver of the abnormal condition of said inspection item when a parameter for determining the generation of a cautioning voice has reached a predetermined level of generation of the cautioning voice after the time point of said decision of the first abnormal level;
deciding that the condition of said inspection item has reached a second abnormal level higher than said first abnormal level;
and automatically generating a voice warning the driver of an abnormal condition of said inspection item regardless of the driving condition of said car at the time of said decision on the reaching of said second abnormal level.

2. A method for indicating an abnormal condition of an automobile according to claim 1, wherein said parameter for determining the generation of the cautioning voice is the speed of the automobile, and the voice cautioning the driver of the abnormal condition of said inspection item is automatically generated upon detection of the fact that, starting with the time point of said decision on the reaching of the first abnormal level, the driving of the automobile is stopped and the speed thereof is reduced to zero.

3. A method of indicating an abnormal condition of an automobile according to claim 1, wherein said parameter for determining the generation of the cautioning voice is a condition of a demand switch adapted for demanding the generation of a cautioning voice, and a voice cautioning the driver of an abnormal condition of said inspection item is automatically generated upon detection of the fact that, starting with the time point of said decision on the reaching of said first abnormal condition, said demand switch is turned on.

4. A method of indicating an abnormal condition of an automobile according to claim 1, wherein said warning voice is generated while visually displaying said warning simultaneously.

5. A method of indicating an abnormal condition of an automobile according to claim 1, 2, 3 or 4, wherein said inspection item is the temperature of the cooling water for the engine.

6. A method of indicating an abnormal condition of an automobile according to claim 1, wherein said inspection item is the air pressure of the tires of the automobile.

7. A method of indicating an abnormal condition of an automobile according to claim 1, wherein said voice is synthesized by a digital voice synthesizer.

8. A method of indicating an abnormal condition of an automobile according to claim 1, wherein the voice generation is capable of being stopped by manual operation.

9. A system for indicating an abnormal condition of an automobile, comprising:
detector means for detecting the condition of an inspection item relating to the driving of the automobile and producing a detection signal;
sensor for detecting the level of said parameter for determining the generation of a cautioning voice and producing a signal corresponding to the level of said parameter;
operational processing means for producing a first abnormality signal when deciding that said detection signal from said detector means has reached a first abnormal level and that said signal from said sensor has reached a predetermined level for issuing a caution signal, said operational processing means producing a second abnormality signal regardless of the condition of the signal of said sensor when deciding that said detection signal from said detector means has reached a second abnormality level; and
voice generator means for generating a voice cautioning the driver of the abnormal condition of said inspection item in response to a first abnormality signal from said operational processing means, said voice generator means generating a voice warning the driver of the abnormal condition of said inspection item in response to a second abnormality signal.

10. A system for indicating an abnormal condition of an automobile according to claim 9, wherein said sensor is an automobile speed sensor for detecting the running speed of the automobile and producing an automobile speed signal, and said operational processing means produces the first abnormality signal when it has decided that the detection signal from said detector means has reached the first abnormal level and that the automobile speed signal from said automobile speed sensor has reached a stop level.

11. A system for indicating an abnormal condition of an automobile according to claim 9, further comprising a demand switch for demanding a caution signal and associated circuit as said sensor for producing a demand signal upon turning on of said demand switch, said operational processing means producing the first abnormality signal when it has decided that the detection signal from said detector means has reached the first abnormality level while at the same time deciding on the basis of said demand signal from said sensor that said demand switch has been turned on.

12. A system for indicating an abnormal condition of an automobile according to claim 9, further comprising display means for effecting a visual display of a warning in parallel with the production of said warning voice.

13. A system for indicating an abnormal condition of an automobile according to claim 9, 10, 11 or 12, wherein said detector means is an engine cooling water temperature sensor for indicating an abnormal condition including an overheated condition of the engine.

14. A system for indicating an abnormal condition of an automobile according to claim 9, said detector means is an air pressure sensor for detecting the air pressure of the tires of the automobile, an abnormal condition being indicated when the air pressure of at least one of said tires is reduced below a predetermined level.

15. A system for indicating an abnormal condition of an automobile according to claim 9, wherein said voice generator means includes a digital voice synthesizer for synthesizing a voice in accordance with the abnormality signal from said operational processing means.

16. A system for indicating an abnormal condition of an automobile according to claim 9, further comprising a stop switch for stopping the generation of the voice.

* * * * *